US008559338B2

(12) United States Patent
Jeon et al.

(10) Patent No.: US 8,559,338 B2
(45) Date of Patent: *Oct. 15, 2013

(54) METHOD FOR MANAGING THE POWER IN THE WIRELESS NETWORK

(75) Inventors: Beom Jin Jeon, Seoul (KR); Hyeon Cheol Cho, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

This patent is subject to a terminal disclaimer.

(21) Appl. No.: 13/560,846

(22) Filed: Jul. 27, 2012

(65) Prior Publication Data

US 2012/0287835 A1    Nov. 15, 2012

Related U.S. Application Data

(63) Continuation of application No. 12/562,110, filed on Sep. 17, 2009, now Pat. No. 8,259,618, which is a continuation of application No. 12/373,190, filed as application No. PCT/KR2007/004978 on Oct. 11, 2007, now Pat. No. 7,969,912.

(30) Foreign Application Priority Data

Oct. 13, 2006  (KR) .................. 10-2006-0099890

(51) Int. Cl.
*H04L 12/28* (2006.01)
*G08C 17/00* (2006.01)

(52) U.S. Cl.
USPC .......................................... 370/254; 370/311

(58) Field of Classification Search
USPC ................. 370/254, 255, 311, 401
See application file for complete search history.

(56) References Cited

U.S. PATENT DOCUMENTS

| 5,583,866 | A  | * | 12/1996 | Vook et al. ................... 370/312 |
| 5,881,055 | A  | * | 3/1999 | Kondo ........................... 370/311 |
| 6,665,520 | B2 | * | 12/2003 | Romans ...................... 455/13.4 |
| 7,522,547 | B2 | * | 4/2009 | Lee et al. ..................... 370/312 |
| 7,715,885 | B2 | * | 5/2010 | Arunan et al. ............... 455/574 |
| 2002/0016151 | A1 |  | 2/2002 | Romans |
| 2003/0119568 | A1 |  | 6/2003 | Menard |
| 2005/0190710 | A1 | * | 9/2005 | Chandra et al. ............. 370/311 |

(Continued)

FOREIGN PATENT DOCUMENTS

| JP | 08195754 | 7/1996 |
| JP | 2005080158 | 3/2005 |

(Continued)

*Primary Examiner* — Hong Cho
(74) *Attorney, Agent, or Firm* — Lee, Hong, Degerman, Kang & Waimey

(57) ABSTRACT

A wireless network system includes a coordinator, a first device, and a second device. The coordinator transmits a first response to the first device to approve a first request message received from the first device; broadcast a first beacon, indicating that the first device is in a power saving mode, after transmitting the first response; transmit a second response to the second device to approve a second request message received from the second device; broadcast a second beacon, indicating that the first device needs to change a power management mode from the power saving mode to a normal mode, after transmitting the second response; transmit a third response to the first device to approve a third request message received from the first device; and broadcast a third beacon, indicating that the first device is in the normal mode, after transmitting the third response.

7 Claims, 6 Drawing Sheets

(56) References Cited

U.S. PATENT DOCUMENTS

| | | |
|---|---|---|
| 2005/0207400 A1 | 9/2005 | Shinohara |
| 2005/0233704 A1* | 10/2005 | Maekawa ........................ 455/69 |
| 2006/0133408 A1 | 6/2006 | Nogueira-Nine et al. |
| 2006/0174030 A1 | 8/2006 | Choi et al. |
| 2006/0270437 A1 | 11/2006 | Ueda et al. |
| 2007/0036105 A1 | 2/2007 | Chun et al. |
| 2007/0127403 A1* | 6/2007 | Lu et al. ........................ 370/311 |
| 2008/0232286 A1* | 9/2008 | Habetha et al. ............... 370/311 |
| 2009/0109887 A1* | 4/2009 | Chandra et al. ............... 370/311 |

FOREIGN PATENT DOCUMENTS

| | | |
|---|---|---|
| JP | 2005101756 | 4/2005 |
| JP | 2006135549 | 5/2006 |
| JP | 2006148906 | 6/2006 |
| JP | 2007525891 | 9/2007 |
| KR | 1020010035871 | 5/2001 |
| KR | 1020050024760 | 3/2005 |
| WO | 02063806 | 8/2002 |
| WO | 2006049415 | 5/2006 |

\* cited by examiner

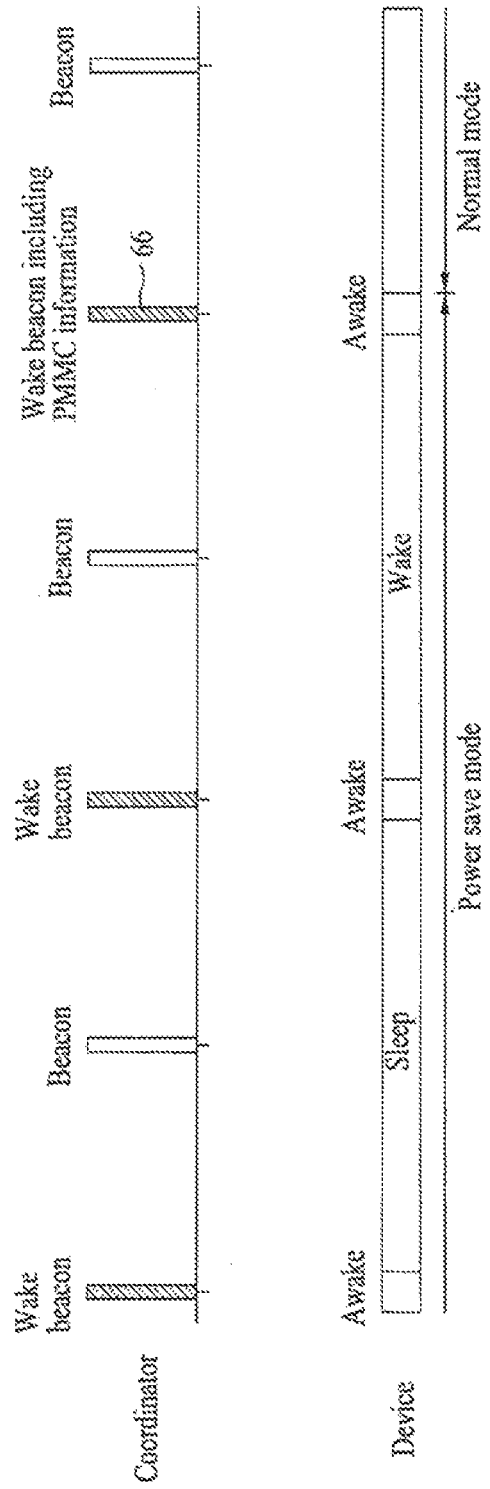

METHOD FOR MANAGING THE POWER IN THE WIRELESS NETWORK

This application is a continuation of U.S. patent application Ser. No. 12/562,110, filed on Sep. 17, 2009, now U.S. Pat. No. 8,259,618, which is a continuation of U.S. patent application Ser. No. 12/373,190, filed on Jan. 9, 2009, now U.S. Pat. No. 7,969,912, which is the national stage filing under 35 U.S.C. 371 of International Application No. PCT/KR2007/004978, filed on Oct. 11, 2007, which claims the benefit of earlier filing date and right of priority to Korean Patent Application No. 10-2006-0099890, filed on Oct. 13, 2006, the contents of which are all hereby incorporated by reference herein in their entirety.

TECHNICAL FIELD

The present invention relates to a wireless network, and more particularly, to a method for controlling power of a device performing communication via a wireless network.

BACKGROUND ART

Recently, many efforts have been made to develop such a technology as Bluetooth, WPAN (wireless personal area network) and the like for exchanging audio/video data between devices via a wireless network between the relatively small number of digital devices in a limited spate such as a house, a small-size work place, etc.

WPAN is usable in exchanging information between the relatively small number of digital devices in relatively close distance and enables the digital devices to perform low-power and low-cost communication in-between.

IEEE 802.15.3 [Wireless Medium Access Control (MAC) and Physical Layer (PHY) Specifications for High Rate Wireless Personal Area Networks (WPANs)], which is approved on Jun. 12, 2003, defines specifications about medium access layer (MAC) and physical layer (PHY) of high-rate WPAN.

If communication is carried out through wireless technology, it is able to remove wires including cables and the like to connect the devices together. And, it is also able to exchange data information directly between devices through device-to-device wireless network communication.

And, all devices including a computer, a personal digital assistant (PDA), a notebook computer, a digital TV, a camcorder, a digital camera, a printer, a microphone, a speaker, a headset, a barcode reader, a display, a mobile phone and the like are usable in performing communication on the network.

If a power equal to that used in performing communication is consumed while devices constructing a wireless network stop performing wireless communication, the power is consumed of no use to reduce efficiency of a wireless network communication system. So, the demand for a power management method for reducing a required power quantity in the course of not performing data transmission and/or reception between devices rises.

Specifically, since a device operable by a battery power source has a limited usable power quantity, a method of elongating a communication time by reducing power consumption is required.

DISCLOSURE OF THE INVENTION

Technical Problem

Accordingly, the present invention is directed to a method for controlling a power in a wireless network that substantially obviates one or more of the problems due to limitations and disadvantages of the related art.

An object of the present invention is to provide a method of performing a power management in a wireless network more efficiently, by which wireless communication can be smoothly carried out.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for managing a power in a wireless network including a coordinator and at least one device comprises receiving a first beacon including power management mode change information from the coordinator in a first device in a power save mode, and changing a power management mode in accordance with the power management-mode change information.

The power management mode change information may instruct the power save mode to be changed into a normal mode. And, in the step of changing power management mode, the power management mode may be changed from the power save mode to the normal mode possible for data transmission and reception.

The power managing method may further include receiving a second beacon from the coordinator wherein the second beacon may include information indicating that the power management mode of the first device has been changed.

The power management mode may include a normal mode and the power save mode.

And the power save mode may include an awake state and a sleep state. And a data transmission/reception may be activated in the awake state and inactivated in the sleep state.

And the first device in the power save mode can be in an awake state for every beacon at least.

The power managing method may further include sending a power management mode change request message from the first device to the coordinator and receiving a power management mode change response message in response to the power management mode change request message.

To further achieve these and other advantages and in accordance with the purpose of the present invention, a method for managing a power in a second device attempting to perform communication with a first device in a power save mode in a wireless network including a coordinator and at least one device comprises sending a power management mode change request message associated with the first device from the second device to the coordinator and receiving a first beacon including power management mode change information for the first device from the coordinator.

The power managing method may further include receiving a second beacon from the coordinator wherein the second beacon includes information indicating that the power management mode of the first device has been changed according to the power management mode change information.

And after receiving the first beacon, the method may further comprises sending a power management mode change request message from the first device to the coordinator and receiving a power management mode change response message in the first device in response to the power management mode change request message.

To further achieve these and other advantages and in accordance with the purpose of the present invention, a method for managing a power by a coordinator in a wireless network including the coordinator and at least one device comprises receiving a power management mode change request message associated with a first device and broadcasting a beacon including power management mode change information for the first device.

The power management mode change request message associated with the first device may be received from at least one of the first device and a second device.

The power management mode may include a normal mode and a power save mode.

And the power save mode may include an awake state and a sleep state. And a data transmission/reception may be activated in the awake state and inactivated in the sleep state.

The first device in the power save mode may is in an awake state for every beacon at least.

And the power save mode of the first device may be changed from the power save mode to the normal mode after receiving the beacon including the power management mode change information in the first device.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention saves a power of a device performing communication in a wireless network. In particular, a power mode change can be more smoothly executed.

Secondly, a user is able to receive a response signal more quickly through the power mode change.

Hence, errors in network communication can be reduced as well.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a diagram to explain another embodiment of the present invention.

BEST MODE

Mode for Invention

Figure 1:
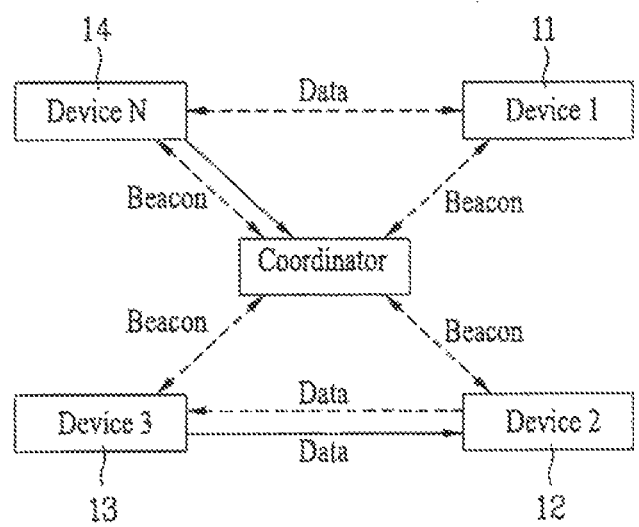
FIG. 1 is a diagram of an example of WVAN including a plurality of devices.

Reference will now be made in detail to the preferred embodiments of the present invention, examples of which are illustrated in the accompanying drawings.

First of all, the present invention provides a method of controlling a power to be consumed by considering an operational state of a device in a wireless network. For the power management of the device, a power mode in accordance with the operational state of the device is defined. The power mode of the device includes a normal mode and a power save mode.

If there is no data to be transmitted/received in the course of performing communication in the normal mode or if the communication is interrupted, the device is able to enter the power save mode from the normal mode. If the normal mode is maintained for the case of not transmitting/receiving data, a corresponding power is unnecessarily consumed. So, by defining the power save mode, it is able to control a power.

The normal mode can be called an active mode. The power save mode can include an asynchronized power save (APS) mode, a piconet synchronized power save (PSPS) mode, and a device synchronized power save (DSPS) mode.

The asynchronized power save (APS) mode means a case that a device in a power save mode independently carries out a state change. The piconet synchronized power save (PSPS) mode means a case that a device in a power save mode enters an awake state at a timing agreed with a network. And, the device synchronized power save (DSPS) mode means a case that, after a prescribed device group bas been formed, an awake state is entered at a timing agreed within the device group.

A power state of a device in a power save mode can be divided into an awake state and a sleep state. The sleep state is defined as a state that a device is unable to perform transmission and reception since each device stops a communication function. In particular, a device in the sleep state is unable to recognize what kind of status a network is in or what kind of signals are transmitted to the device. The awake state is a concept opposite to the sleep state. And, the awake state means a state that a partial communication function is executable due to an activated configuration for performing a communication function of the device.

In case of a power save mode, a communication module included in a device is in a sleep state for most time and then awakes for a prescribed time to recognize a communication status of a wireless network having the device included therein, a presence or non-presence of a received signal, and the like. In this case, the communication module is constructed with a protocol architecture implemented in a device and carries but a function for performing communication with another device on a wireless network.

So, the awake state is defined as a state that prescribed data can be transmitted or received via the communication module.

Meanwhile, information instructing a mode switching between a normal mode and a power save mode is called control power management mode change (PMMC) information. In particular, information corresponding to a communication request sent by a device or coordinator becomes the power management mode change (PMMC) information.

The following embodiments of the present invention relate to examples that the technical features of the present invention are applied to WVAN (wireless video area network) as a sort of wireless network. The WVAN is a wireless network that uses the wireless HD (WiHD) technology capable of providing throughput over 4.5 Gbps to enable 1080 A/V stream to be transmitted in a short range within 10 m without compression using 60 GHz frequency band.

FIG. 1 is a diagram of an example of WVAN including a plurality of devices.

Referring to FIG. 1, the WVAN is a network configured for date exchange between devices located in a predetermined space.

The WVAN includes at least two or more devices 10 to 14. And, one of the devices works as a coordinator 10. In configuring a wireless network between the devices, a plurality of the devices should share radio resources with each other. To enable the devices to share the radio resources without collision, the coordinator 10 is a device for performing radio resource allocation and scheduling.

The coordinator is provided with a function of allocating resources to enable the devices configuring the network to perform communication. The coordinator is also a normal device capable of transmitting and receiving data via at least one channel. Moreover, the coordinator is able to perform such a function as clock synchronization, network association, maintaining bandwidth resource, and the like as well.

The WVAN supports two kinds of physical layers (PHY). In particular, the WVAN supports HRP (high-rate physical layer) and LRP (low-rate physical layer). The HRP is the physical layer capable of supporting a data rate over 1 Gb/s, and the LRP is the physical layer capable of supporting a data rate of several Mb/s. The HRP is highly directional and is used for transmissions of isochronous data stream, asynchronous data, MAC command and A/V data via unicast connection. And, the LRP supports a directional or omni-directional mode and is used for transmissions of a beacon, asynchronous data, a MAC command including a beacon, and the like via unicast or broadcast. HRP channel and LRP channel share a frequency band with each other and are discriminated in use from each other by TDM. The HRP uses four channels of 2.0 GHz bandwidth on 57~66 GHz band. And, the LRP uses three channels of 92 MHz bandwidth.

Figure 2:
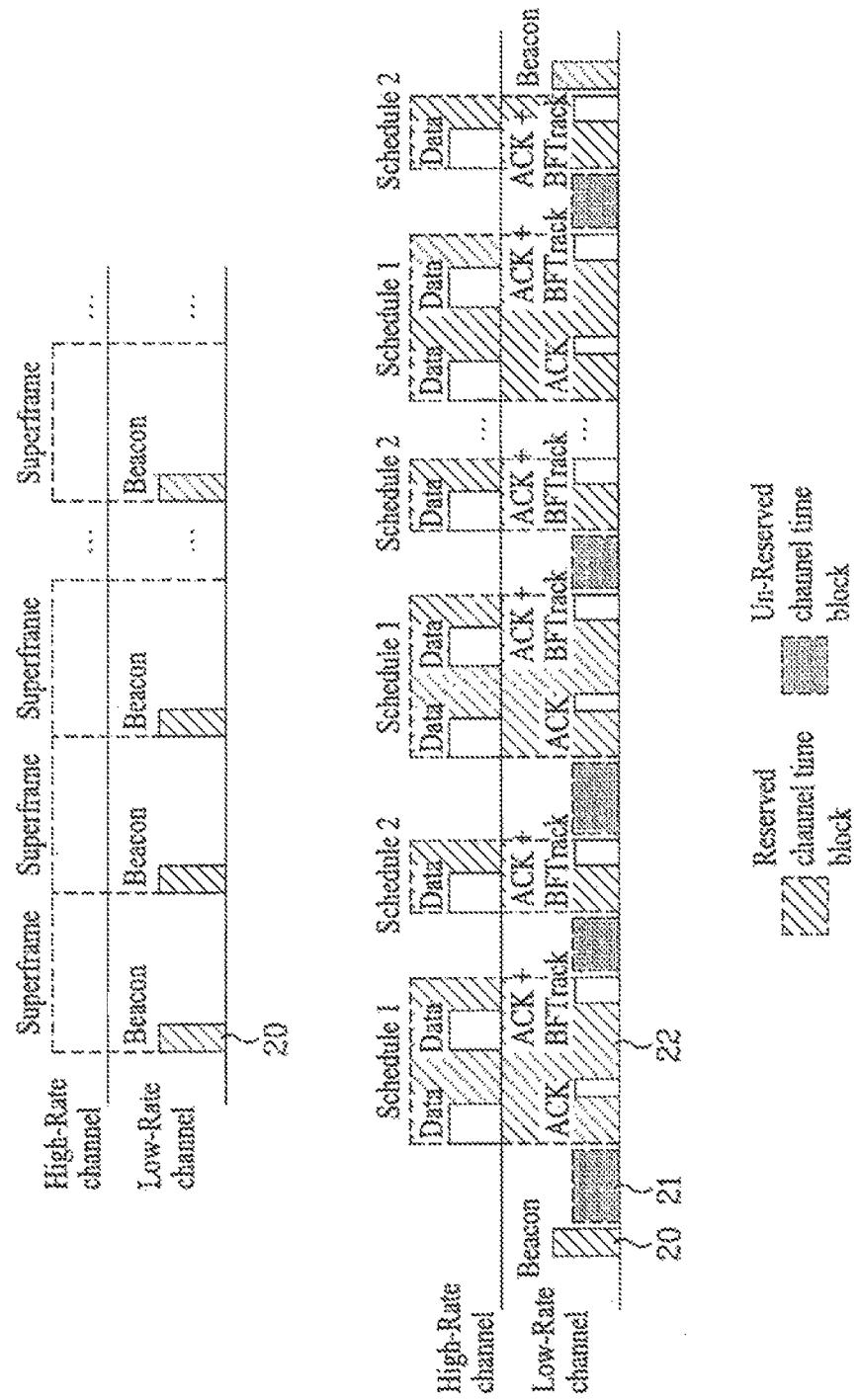
FIG. 2 is a diagram to explain an example of superframe structure used for WVAN.

FIG. 2 is a diagram to explain an example, of a superframe structure used for WVAN.

Referring to FIG. 2, each superframe includes a region 20 for transmitting a beacon, a reserved channel time block 22, and an unreserved channel time block 21. And, each of the channel time blocks is time-divided into a region (HRP region) for transmitting data via HRP and a region (LRP region) for transmitting data via LRP.

The beacon 20 is periodically transmitted by the coordinator to identify an introduction part of each superframe. The beacon includes scheduled timing information and management and control information on the WVAN. The device is capable of performing data exchange on the network through the timing information, the management/control information and the like included in the beacon.

the HRP region is usable for a device, to which a channel time is allocated by the coordinator in accordance with a channel time allocation request made by the device, to transmit data to another device.

Although not shown in FIG. 2, contention-based control period (CBCP) located next to the beacon is included to transmit an urgent control/management message. A period length of the CPCP is set not to exceed a preset threshold (mMAXCBCPLen).

Figure 3:
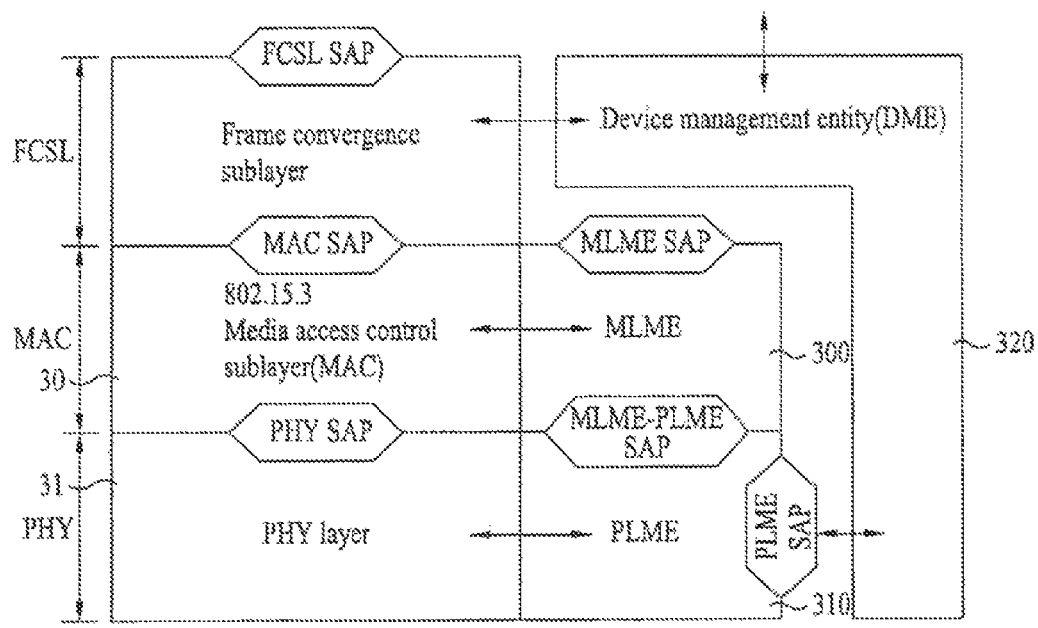
FIG. 3 is a diagram of a protocol layer architecture implemented in s device of WVAN.

FIG. 3 is a diagram for a hierarchical protocol structure implemented in a device of WVAN.

Referring to FIG. 3, a communication module of each device included in WVAN can be divided into at least two layers according to its functions and generally includes a PHY layer 31 and a MAC layer 30.

The communication module of the device includes entities managing the layers, respectively. The entity managing the MAC layer is called MLME (MAC layer management entity) 300. And, the entity managing the PHY layer is called PLME (PHY layer management entity) 310.

And, the communication module includes a device management entity (DME) 320 that collects status information on each device and plays a role as a control path (interface) between a host and a wireless device. A message exchanged between layers different from each other is called a primitive. And, the communication module is called a modem.

Figure 4:
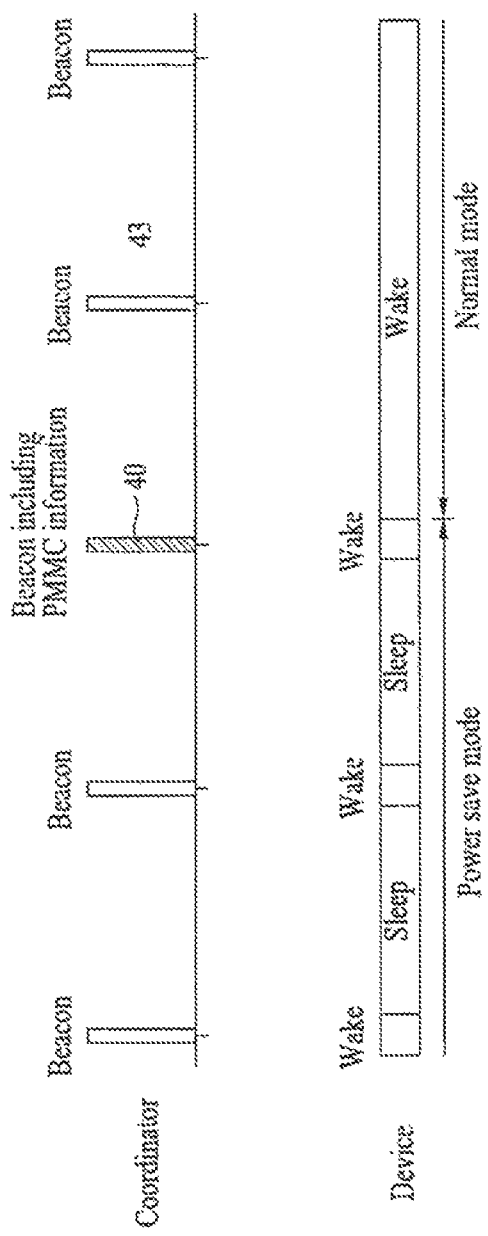
FIG. 4 is a diagram to explain one embodiment of the present invention.

FIG. 4 is a diagram to explain one embodiment of the present invention. A method of switching between a power save mode and a normal mode for a power management is explained with reference to FIG. 4 as follows.

A coordinator included in a wireless network (WVAN), as shown in FIG. 1, broadcasts a beacon containing informations for controlling the wireless network.

Each device recognizes channel time allocation information through the beacon. The device then reserves a channel time period for communication or performs communication through contention.

It is assumed that a random device included in the wireless network is in a power save mode. In case of attempting to switch the power save mode of the device to a normal mode, a corresponding operation of the device is described as follows.

A device in a power save mode is in either a sleep state or an awake state. If the device is always in the sleep state despite being in the power save mode, it is unable to recognize what kind of device attempts to perform communication with the former device in the sleep state. So, it is difficult to sustain the communication on the wireless network. So, the modem enters the awake state for a prescribed channel time and then observes whether there exists a received signal or not.

Since the device is in the power save mode, it is unable to perform communication for all channel times. Yet, the modem enters the awake state and then receives or transmits mode change information, control information, etc. In this case, the prescribed channel time is called an awake state period.

The modem of the device in the power save mode keeps being in the sleep state and then enters the awake state at a timing point a little bit ahead of a timing point of transmitting a beacon. This is because a prescribed time is required for switching to the awake state from the sleep state. Preferably, a difference between a timing point of switching to the awake state and a timing point of transmitting a beacon is minimized. Yet, the modem should keep the awake state for the beacon period of broadcasting the beacon.

After a transmission of a single beacon has been completed, the modem enters the sleep mode again.

Although it is preferable that the awake state period is minimized, it is set to include the beacon period.

When a beacon is transmitted by containing power management made change (PMMC) information therein, the device in the power save mode keeps the awake state for the beacon period only. As a time portion in the sleep state is relatively increased, it is effective to save power consumption.

Referring to FIG. 4, the coordinator sustains an awake state for a beacon period for broadcasting.

A beacon 40 containing the power management mode change (PMMC) information is broadcasted.

The modem of the device in a power save mode checks the beacon by sustaining the awake state for the period for broadcasting the beacon and is able to receive the power management mode change (PMMC) information.

In case that the modem of the device receives the power management mode change (PMMC) information, which is transmitted by being contained in the beacon, in a manner of switching to the awake state and checking the beacon, the device performs a mode switching to a normal mode from the power save mode.

If the device enters the normal mode by performing the mode switching, it is able to perform communication with other devices included in the wireless network as well as the device having made the mode change request.

The device awakens by a period corresponding to each beacon period and then observes all broadcasted beacons to check checked whether the power management mode change (PMMC) information is transmitted. As the device fails to check the beacon containing the power management mode change (PMMC) information, if the device is unable to make a response to a mode change request made by a different device, the different device making the mode change may transmit the mode change request signal doubly. So, system efficiency is reduced. Preferably, the coordinator checks all broadcasted beacons to cope quickly without missing the power management mode change (PMMC) information.

Figure 5:
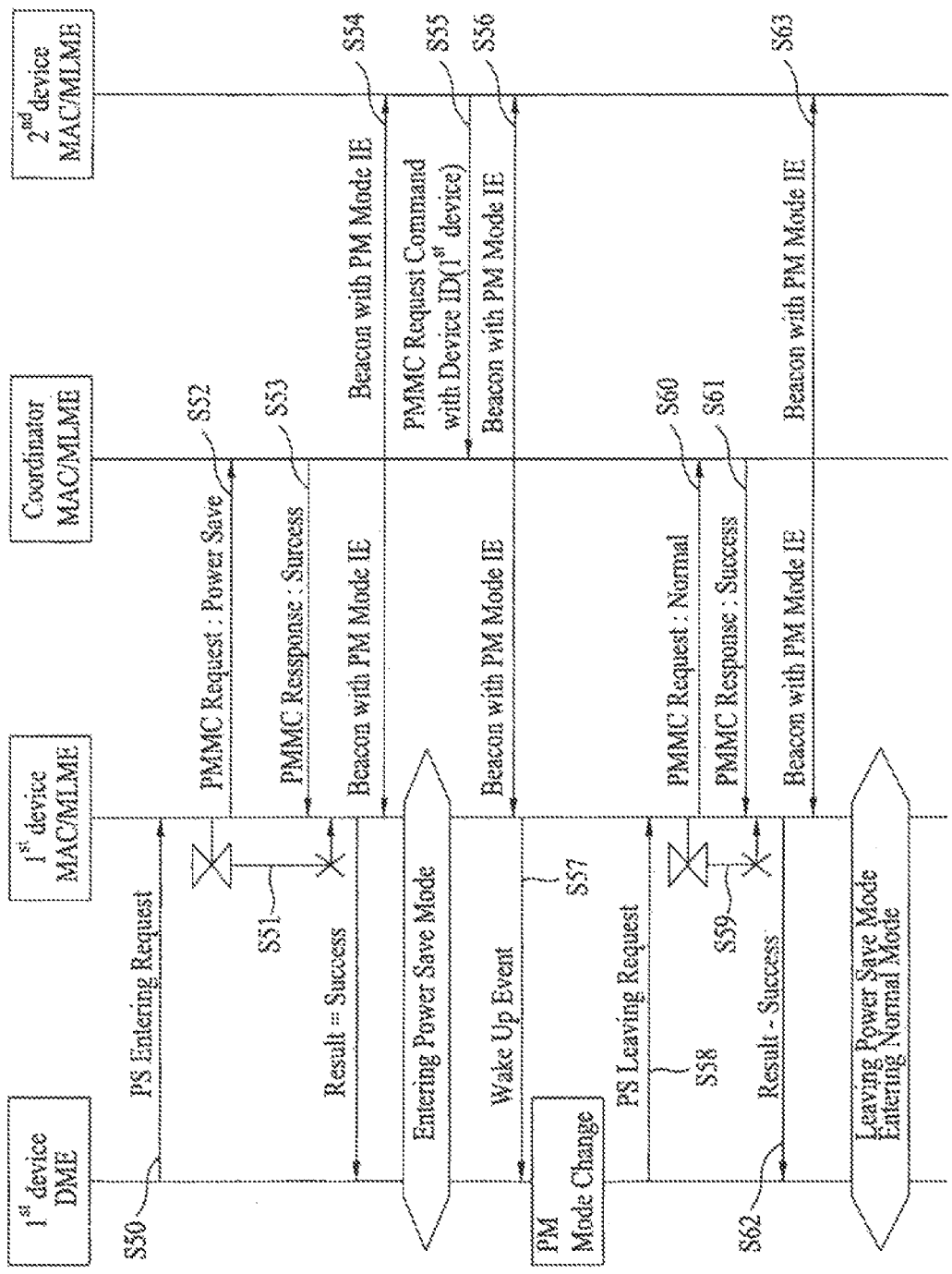
FIG. 5 is a flowchart of one embodiment of the present invention.

FIG. 5 is a flowchart of one embodiment of the present invention. A mode changing method between a power save mode and a normal mode is described with reference to FIG. 5 as follows.

In the following description, it is assumed that a WVAN includes a coordinator, a first device, and a second device. And, it is also assumed that an initial mode of each of the coordinator, the first device and the second device is a normal mode.

First of all, the first device attempts to enter a power save mode. A DME of the first device sends a PS Entering Request primitive to an MLME of the first device to send a message for making a request for entering power save mode (S50).

The MLME of the first device receives the primitive and then sends a power save mode change request message (PMMC Request) for making a request for entering the power save mode to the coordinator (S52).

The coordinator sends a power save mode change response message (PMMC Response) in response to the power save mode change request message to the MLME of the first device. In case of approving the request for entering the power save mode, the power save mode change response message (PMMC Response) is transmitted by including success information therein (S53).

After the power save mode change request message has been sent, it is preferable that the power save mode change response message is received within a predetermined time. So, after having sent the power save mode change request message, the first device can activate a timer for setting the predetermined time therein. If the power save mode change response message is received before the timer expires, the first device can deactivate an operation of the timer (S51). The first device sends the power save mode change request message containing information on the predetermined time therein to enable a device having received the power save mode change request message to transmit the power save mode change response message within the predetermined time.

In broadcasting a next beacon, the coordinator broadcasts a beacon including information indicating that the power mode of the first device has been changed in order to announce that the first device has entered the power save mode (S54).

An example of the beacon frame format is proposed in Table 1. The beacon is a message that is periodically transmitted to discriminate a beginning of each super frame.

TABLE 1

| 1 | 1 | variable | ... | variable | ... | variable | ... | 4 |
|---|---|---|---|---|---|---|---|---|
| Beacon control | CBCP end time | IE 1 | | IE m | | IE n | | CRC |

Referring to Table 1, the coordinator sends beacon control information via the Beacon Control field and also sends information on a CBCP end time via the CBCP end time field. Moreover, IE format information on necessary information is included in the rest of the fields to transmit the necessary information.

For instance, the beacon includes information of the superframe, information on other parameters, etc. In particular, information on a channel period reserved via the beacon message, information of a period length of superframe, information on a transmitting antenna power supportable by a current network and the like are included in the beacon and transmitted.

The information indicating that the power mode has been changed means the information on a current mode changed through the mode change and corresponds to either a normal mode or a power save mode. Thus, the beacon including the information indicating that the first device is in the power save mode is broadcasted.

An example of information element (IE) about information indicating that the power mode has been changed is explained as follows.

According to a MAC command or a configuration of the beacon, information indicating which IE will be used can be included and transmitted. So, a message in a defined IE format is sent. Table 2 shows an example of an IE format on information indicating that a mode of the first device has been changed.

TABLE 2

| IE index | IE length=? | MAC address | PM Mode |
|---|---|---|---|

Through MAC address field shown in. Table information on a device having a mode changed can be obtained. Through PM Mode field, it is able to obtain information indicating that the mode of the first device has been changed. In particular, information indicating a normal mode or a power save mode is included.

By inserting an IE proposed by Table 2 is inserted in one of the fields IE1 to IEn of the beacon frame shown in Table 1, the information indicating that the mode of the first device has been changed is transmitted (S54).

Once receiving the power save mode change response message, the MLME of the first device transfers a primitive for announcing a result of success to the DME of the first device. Once receiving, the power save mode change response message, the first device enters a power save mode (entering Power Save Mode). The modem of the first device in the power save mode sustains an awake state for a beacon period of the broadcasting by the coordinator and observes whether a signal of power management mode change (PMMC) information is received for the beacon transmission period. As a result of observation for the beacon period, if the signal of the power management mode change (PMMC) information is not received, the sleep state is entered to maintain the power save mode.

Yet, if the signal of the power management mode change. (PMMC) information is received, a process for reentering the normal mode is executed.

While the first device is in the power save mode, if the second device makes a request for communication with the first device, the power mode of the first device needs to be switched to the normal mode to perform communication between the first and second devices.

In order for the first device to perform a mode change, signal including information on the communication request made by the second device should be received by the first device.

While the first device is in an awake state, if the information on the communication request made by the second device, i.e., the power save mode change (PMMC) information is transmitted, the first device in the power save mode receives the corresponding information to change the mode.

In case that the second device attempts to perform communication with the first device in the power save mode, the second device sends a power save mode change request message (PMMC Request) for requesting a mode change of the first device to the coordinator (S55). The power save mode change request message is sent by including identification information on the first device (device ID).

Having received the power save mode change request message, the coordinator transmits a beacon, in which power management mode change (PMMC) information is included, in broadcasting a next beacon (S56).

Table 3 shows an example of IE format for power management mode change (PMMC) information.

TABLE 3

| IE index | IE length=? | MAC address | PM command |
|---|---|---|---|

Trough MAC address field shown in Table 3, it is able to obtain information on a device (i.e., the first device) that is a target for a mode change request. Through PM command field, it is able to recognize that there exists a mode change request or the first device.

IE for the power management mode change (PMMC) information shown in Table 3 is included in the beacon shown in Table 1 and then transmitted (S56).

The power management mode change (PMMC) information is transmitted in a manner of inserting the IE proposed by Table 3 is inserted in one of the fields IE1 to IEn of the beacon message shown in Table 1.

By transmitting the beacon in a manner that the IE about the power management mode change (PMMC) information is inserted in the beacon, the power management mode change (PMMC) information is transmitted together with beacon control information, information on CBCP and time, information on superframe, information on a reserved channel period, information on a period length of superframe, information on a transmitting antenna power supportable in a current network, other parameters, etc.

The modem of the first device sustains the awake state for all beacon periods and checks whether the power management mode change (PMMC) information is carried by the beacon message. So, if the coordinator transmits the beacon by having the power management mode change (PMMC) information included in the beacon (S56), the power management mode change (PMMC) information can be received.

If the MLME of the first device receives the beacon, the MLME of the first device transfers an event signal (Wake Up Event) for a mode change to the DME (S57).

Having received the event signal, the DME of the first device attempting to change the power management mode transfers a PS leaving Request primitive to the MLME of the first device in order to reenter the normal mode from the power save mode (S58).

Having received the primitive, the MLME sends a power management mode change request message (PMMC Request) making a request for switching to the normal mode to the coordinator (S60).

The coordinator sends a power management mode change response message (PMMC Response) in response to the mode change request to the MLME of the first device (S61). In this case, in case of approving the request for switching to the normal mode, the power management mode change response message is sent in a manner of having success information included therein.

It is also preferable that the power management mode change response message is received within a predetermined time after the power management mode change request message has been sent. So, a timer can be used to indicate that the predetermined time expires. Alternatively, the first device can send the power management mode change request message including the information on the predetermined time so that the coordinator having received the power management mode change request message can send the power management mode change response message within the predetermined time.

Once receiving the power management mode change response message, the MLME of the first device transfers a primitive for announcing a result of success to the DME.

Once receiving the power management mode change response message, the first device enters the normal mode (entering Normal Mode).

Having sent the power management mode change response message including the success information in response to the power management mode change (PMMC) request, the coordinator broadcasts a next beacon including information on the power management mode of the first device, i.e., information indicating that the first device is in the normal mode (S63).

FIG. 6 is a diagram to explain another embodiment of the present invention.

According to another embodiment of the present invention, a wake beacon is set up and a device in a power save mode is forced to observe a channel time for which the wake beacon is transmitted.

The wake beacon is provided in a manner that the device in the power save mode observes a beacon by being in an awake state. For instance, when a cycle of a wake beacon is set to a double of a cycle of a broadcasted beacon, if $1^{st}$ to $n^{th}$ beacons (n is an even number) are transmitted, $2^{nd}$, $4^{th}$, $6^{th}$, ..., and $n^{th}$ beacons become wake beacons.

And, a modem of the device in the power save mode is in an awake state for the wake beacon transmission period.

The device modem in the awake state for each beacon does, not observe whether the power management mode change (PMMC) information is transmitted. Instead, in case of maintaining the awake state for the set wake beacon period only, the device modem observes whether the power management mode change (PMMC) information is transmitted.

In case that the power management mode change (PMMC) information is transmitted, the device modem checks the information while being in the awake state. The device then enters the normal mode by the above method explained with reference to FIG. 5 (600).

In case that the wake beacon is set in the above manner, a period for maintaining the sleep state is increased. Hence, a savable power amount is increased. And, it is able to reduce the troublesomeness in switching to the wake state for each beacon.

Meanwhile, the terminologies used in the above description can have substitutes. For instance, a device can be replaced by a user device or equipment, a station, or the like. A coordinator can be replaced by a coordinating or controlling equipment, a coordinating or controlling device, a coordinating or controlling station, a piconet coordinator (PNC) or the like.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, embodiments of the present invention are applicable to a communication system, a wireless communication system, a home network, and the like.

What is claimed is:

1. A wireless network system comprising:
   a coordinator;
   a first device; and
   a second device,
   wherein the first device is configured to:
      transmit a first request message to the coordinator to request change of a power management mode of the first device from a normal mode to a power saving mode; and
      transmit a third request message to the coordinator to request change of the power management mode of the first device from the power saving mode to the normal mode,
   wherein the second device is configured to:
      transmit a second request message to the coordinator in order to communicate with the first device and request change of the power management mode of the first device from the power saving mode to the normal mode,
   wherein the coordinator is configured to:
      transmit a first response to the first device in response to the first request message, the first response indicating approval of the first request message;
      broadcast a first beacon after transmitting the first response to the first device, the first beacon comprising information indicating that the first device is in the power saving mode;
      transmit a second response to the second device in response to the second request message, the second response indicating approval of the second request message;
      broadcast a second beacon after transmitting the second response to the second device, the second beacon comprising information indicating that the first device needs to change the power management mode of the first device from the power saving mode to the normal mode;
      transmit a third response to the first device in response to the third request message, the third response indicating approval of the third request message; and
      broadcast a third beacon after transmitting the third response to the first device, the third beacon comprising information indicating that the first device is in the normal mode.

2. The wireless network system of claim 1, wherein the second request message includes an identifier of the first device and the requested power management mode.

3. The wireless network system of claim 1, wherein the first device is further configured to enter the normal mode after receiving the second beacon.

4. The wireless network system of claim 1, wherein the power saving mode includes an awake state during which data transmission and reception is activated and a sleep state during which data transmission and reception is deactivated.

5. The wireless network system of claim 4, wherein the first device which is in the power saving mode is in the awake state for at least receipt of beacons.

6. The wireless network system of claim 1, wherein the first device is further configured to transfer a primitive from a Media Access Control (MAC)/MAC Layer Management Entity (MLME) sublayer of the first device to a station management entity (SME) of the first device to indicate the change of the power management mode from the normal mode to the power saving mode.

7. The wireless network system of claim 1, wherein the first device is further configured to transfer a primitive from a Media Access Control (MAC)/MAC Layer Management Entity (MLME) sublayer of the first device to a station management entity (SME) of the first device to indicate the change of the power management mode from the power saving mode to the normal mode.

* * * * *